United States Patent
Tadych

(10) Patent No.: US 9,446,437 B1
(45) Date of Patent: Sep. 20, 2016

(54) METHODS OF CLEANING AND PROTECTING SURFACES AND ISOLATING VOLUMES

(71) Applicant: John E. Tadych, Franklin, WI (US)

(72) Inventor: John E. Tadych, Franklin, WI (US)

( * ) Notice: Subject to any disclaimer, the term of this patent is extended or adjusted under 35 U.S.C. 154(b) by 0 days.

(21) Appl. No.: 14/932,801

(22) Filed: Nov. 4, 2015

Related U.S. Application Data

(63) Continuation-in-part of application No. 13/694,522, filed on Dec. 10, 2012, now abandoned, and a continuation-in-part of application No. 12/584,164, filed on Aug. 31, 2009, now abandoned, which is a continuation-in-part of application No. 10/762,663, filed on Jan. 22, 2004, now abandoned.

(60) Provisional application No. 61/685,001, filed on Mar. 10, 2012, provisional application No. 61/685,601, filed on Mar. 21, 2012.

(51) Int. Cl.
| | |
|---|---|
| *B08B 7/00* | (2006.01) |
| *C11D 7/24* | (2006.01) |
| *C11D 7/04* | (2006.01) |
| *C11D 7/32* | (2006.01) |
| *C11D 17/00* | (2006.01) |
| *C11D 11/00* | (2006.01) |

(52) U.S. Cl.
CPC ............ *B08B 7/0014* (2013.01); *C11D 7/04* (2013.01); *C11D 7/244* (2013.01); *C11D 7/3209* (2013.01); *C11D 17/0008* (2013.01); *B08B 7/00* (2013.01); *C11D 11/0023* (2013.01); *C11D 11/0058* (2013.01)

(58) Field of Classification Search
CPC ......... B08B 7/0014; B08B 7/00; C11D 7/04; C11D 7/244; C11D 7/3209; C11D 17/0008; C11D 11/0023; C11D 11/0058
See application file for complete search history.

(56) References Cited

U.S. PATENT DOCUMENTS

| | | | | |
|---|---|---|---|---|
| 3,095,397 | A * | 6/1963 | Musch | C09D 109/10 524/321 |
| 3,193,517 | A * | 7/1965 | Gindler | C08F 22/00 524/724 |
| 3,494,878 | A * | 2/1970 | Haag | B01J 47/007 427/388.4 |
| 3,736,287 | A * | 5/1973 | Patella | C08F 218/08 524/833 |
| 3,749,690 | A * | 7/1973 | Patella | C08F 220/12 427/385.5 |
| 4,632,847 | A * | 12/1986 | Lomasney | B08B 17/04 134/4 |
| 5,120,369 | A * | 6/1992 | Malotky | B08B 7/0014 134/10 |
| 6,110,525 | A * | 8/2000 | Stoddard | C09D 109/08 252/383 |
| 7,204,890 | B2 * | 4/2007 | Held, III | B08B 7/0014 134/26 |
| 2003/0000547 | A1 * | 1/2003 | Carpenter | B08B 7/0014 134/1.3 |
| 2004/0025907 | A1 * | 2/2004 | Tadych | C09D 9/005 134/38 |
| 2005/0164024 | A1 * | 7/2005 | Tadych | C08K 3/0033 428/492 |
| 2006/0194905 | A1 * | 8/2006 | Tadych | B05D 1/322 524/157 |

* cited by examiner

*Primary Examiner* — Bibi Carrillo
(74) *Attorney, Agent, or Firm* — Albert W Davis, Jr.

(57) ABSTRACT

The invention provides a method of cleaning a surface by providing a cleaning composition having a prevulcanized natural rubber latex, at least one detergent additive and aqueous ammonia and other bases to provide a pH of the cleaning composition of at least 8, applying the cleaning composition to the surface, allowing the composition to form an elastic rubber film/membrane and removing the elastic rubber film/membrane from the surface with the unwanted matter attached to the membrane.

4 Claims, No Drawings

METHODS OF CLEANING AND PROTECTING SURFACES AND ISOLATING VOLUMES

CROSS-REFERENCE TO RELATED APPLICATIONS

This application is a continuation-in-part of Ser. No. 13/694,522 filed Dec. 10, 2012 by John E. Tadych for METHODS OF CLEANING AND PROTECTING SURFACES AND ISOLATING VOLUMES which is now abandoned and which claims the benefit of provisional patent applications Ser. No. 61/685,001 filed Mar. 10, 2012 and Ser. No. 61/685,601 filed Mar. 21, 2012 and which is a continuation-in-part of Ser. No. 12/584,164, filed Aug. 31, 2009 by John E. Tadych for METHODS OF PROTECTING SURFACES AND ISOLATING VOLUMES which is now abandoned and which is a continuation-in part of Ser. No. 10/762,663, filed Jan. 22, 2004 by John E. Tadych for RUBBER MASKING COMPOUND AND METHODS OF USE which is now abandoned.

BACKGROUND OF THE INVENTION

This invention relates to methods and compounds for cleaning surfaces, for protecting surfaces from undesired contact with a coating, a liquid or solid particles, for masking surfaces and for isolating areas and volumes.

BRIEF SUMMARY OF THE INVENTION

The invention is rubber-based cleaning/masking compounds and methods of using the compounds which have multiple uses. In one preferred embodiment, the invention is a cleaning compound comprising a vulcanized rubber latex, at least one filler and aqueous ammonia.

In another preferred embodiment, the invention is a process for masking a surface. The process comprises the steps of: (1) applying a masking compound comprising a vulcanized rubber latex, at least one filler and aqueous ammonia to a surface to be masked; (2) allowing the masking compound to dry and form an elastic rubber membrane, thereby forming a masked surface; (3) applying a coating to a surface to be coated in the vicinity of the masked surface; and, (4) removing the elastic rubber membrane from the substrate subsequent to coating the surface to be coated.

In still another preferred embodiment, the invention is a method of isolating a space. The method comprises the steps of: (1) providing a first space and a second space, wherein the first space and second space are connected by an opening or perimeter having at least one edge; (2) applying an adhesive masking compound along at least part of the edge of the opening or in close proximity to the opening; (3) affixing or applying a sheet or film or a drop cloth to the masking compound such that the sheet covers the opening, thereby isolating the first space from the second space. Also, the adhesive masking compound can be used to isolate a surface or a portion of a surface. The adhesive masking compound is applied to at least portions of the perimeter of the surface or the portion of the surface to be isolated as in the isolation of volumes. A sheet can then be applied to the masking compound to isolate the surface or the portion of the surface. The masking compound holds the sheet securely in a weather resistant seal. The elastic film can be peeled cleanly from the surface and also from the sheet. The ability to easily separate the elastic film and the sheet allows the sheet to be reused on the same or a different surface or volume. The sheet will prevent the introduction of drywall dust, remodeling dust, paint overspray, fumes, etc. from entering the protected surface.

Another preferred embodiment of the invention is a method of dividing a space. The method comprises the steps of: (1) providing a first space, wherein the first space is at least partially defined by a first surface and an opposing second surface; (2) applying an adhesive masking compound to at least part of the first surface; and, (iii) affixing or applying a sheet or film to the masking compound such that the sheet forms an at least partial barrier, thereby dividing the first space into a second space and a third space. This process prevents the related particulates and/or fumes from entering and polluting the atmosphere (i.e., circuit board cleaning, etc.).

Another preferred embodiment of the invention is a method of using the mask in a process for filling a crack in a surface. The mask is applied to cover the crack. When the mask dries, the resultant membrane adheres to each side of the crack and bridges the crack. A hole is made in the membrane at the center and at each end of the crack. Then, a crack filling material is injected through the center hole into the crack. The injection of filler material is stopped when the filler material comes out of the holes in each end of the membrane. Once the filler material sets or dries, the membrane is removed. The adhesion of the mask holds the membrane to the surface with sufficient force to provide a temporary cover during the injection process. The tackiness gives the mask the ability to stay in position during the injection process and to withstand the forces of the injection process which try to separate the membrane from the surface.

In a further preferred embodiment, the invention is a process for cleaning a surface from dirt, particles or particulates, adhesives, graffiti paint, building paint and other unwanted matter, without solvent or water washing, airborne contamination, dust and other pollutants.

The process comprises the steps of: (1) applying a cleaning compound comprising a vulcanized rubber latex, at least one filler and aqueous ammonia to a surface to be cleaned; (2) allowing the masking compound to attack the unwanted matter and coalesce/dry to form an elastic rubber membrane; and (3) removing the elastic rubber membrane and adhered or attached unwanted matter or dirt on the membrane from the surface by pulling the membrane from the surface.

Another cleaning process comprises the steps of: (1) applying a cleaning compound comprising a vulcanized rubber latex, at least one filler and aqueous ammonia to a surface to be cleaned; (2) allowing the masking compound to attack the unwanted matter and coalesce/dry to form an elastic rubber membrane; (3) removing the elastic rubber membrane and (4) removing the building paint or graffiti paint by brushing or scouring the surface.

The removal of decals and other adhesive attachments is also possible through the topical application of the masking/cleaning compound. Undesired decals and other adhesives are removable without damaging the underlying substrate. The masking/cleaning compound adheres to the undesired decal which has been loosened by solvents in the cleaning compound and can then be successfully removed after the membrane has been coalesced or dried by applying a manual force or pulling action to the membrane.

The cleaning composition/cleaning/masking compound can be used to clean bathroom tiles and grout, and other places where it is also desirable to disinfect the surface. The cleaning/masking compound provides cleaning and disinfecting without having to use water to rinse the surface thereby eliminating unintended problems of using water, such as stains, hard water spots, bacterial build-up, etc.

The cleaning/masking compound can be used on interior and exterior masonry structures, such as cathedrals, churches, tombstones, monuments and other structures, such as fireplaces, drywall, etc.

The cleaning/masking compound can be used as a paint remover which will remove oil or latex paint from any surface. The cleaning/masking compound can also remove varnish, MAGIC MARKER™, etc. The cleaning/masking compound is especially useful for removing graffiti from structures.

The cleaning/masking compound is applied in the wet or liquid form to the surface where it penetrates into crevices, pores, holes, etc. The cleaning additives in the cleaning/masking compound loosen the unwanted matter on the surface which allows the unwanted matter to migrate and to be trapped in the latex. The latex then dries to a latex membrane or film with the unwanted matter joined to it. The latex membrane is then removed with the unwanted matter joined to it, thereby cleaning the surface. The membrane dries to a non-sticky or non-tacky film.

DETAILED DESCRIPTION OF THE INVENTION

The inventive cleaning/masking compound is a removable latex-based coating designed to clean surfaces, and protect substrates from paint overspray, tuck pointing smears, etc. The cleaning/masking compound can also be used as an adhesive in combination with plastic sheeting to isolate an area or room. The compound typically comprises a rubber polymer latex, a filler, ammonia and other additives.

The latex is an aqueous suspension of a rubber polymer. Suitable rubber polymers include natural rubber (polyisoprene). Synthetic rubbers may also be suitable, including sodium polysulfide, polychloroprene, butadiene-styrene copolymers, acrylonitrilebutadiene copolymers, ethylenepropylene-diene rubbers, synthetic polyisoprene, butyl rubber kraton rubber (copolymer of isobutylene and isoprene), polyacrylonitrile, silicone, epichlorohydrin and polyurethane.

A preferred polymer is natural polyisoprene. The rubber latex should be vulcanized prior to use in the masking/cleaning compound. Vulcanization of rubber is well-known in the art and any suitable vulcanization process may be used.

Prevulcanized latexes are commercially available, for example, #2000 Compound, a prevulcanized natural latex available from Killian Latex, Inc. of Akron, Ohio. Killian latex #2000 Compound has ammonia and EDTA of 1% dry wt. in an aqueous solution present in the latex. Natural rubber latex (polyisoprene) is the preferred latex because it provides a high degree of adhesion which helps in the removal of the unwanted matter on the surface to be cleaned.

The latex has had a vulcanizing system added to it that can vulcanize the latex at room temperature thereby prevulcanizing the latex. Then, when the film/membrane is pulled from the surface to be cleaned the dirt particles adhere to the film and come off with the film.

EDTA

The amount of EDTA (Ethylene DiamineTetraacidic Acid) is increased from the 1% by dry wt. already in the latex to provide a cleaning/masking compound which can sequester lead and other heavy metals. If the used cleaning/masking compound passes the TCLP or other heavy metal leachability test, the used cleaner/mask will be allowed to be deposited in landfills since it will be a non-hazardous material. The amount of EDTA can be less than 2.5% by dry wt. where the amount of heavy metals at the site is low or non-existent. If there are substantial amounts of heavy metals, the amount of EDTA would be increased to levels of 5% or more. The heavy metals can be present at the site from many sources, such as paint, auto exhaust, etc.

Since the cleaning compound is a base composition having a pH of greater than 7, the EDTA composition should be a base composition having a pH of over 7. Such a form of EDTA is TRILON® B LIQUID from the BASF CORPORATION which has tetrasodium ethylenediaminetetraacetate, NaOH and trisodium nitriloacetate and a pH of 11-11.8.

Ammonia and Base Composition Cleaning Compounds

The inventor requires that some of the ammonia be removed by the supplier (Killian) to reduce the noxious fumes that would result when the cleaner was used. The amount of ammonia ($NH_3$) is reduced to 0.1% by wet wt. The supplier then adds enough KOH (0.2% by dry wt.) to the latex dispersion/emulsion to stabilize the latex. The ammonia and KOH are in an aqueous solution of approximately 50-75% water. The ammonia and potash/KOH (potassium hyrdoxide) act as agents which prevent the latex compound from spoiling or turning rancid and also provide a cleaning function by loosening dirt, etc.

Both ammonia and potash are basic compounds/compositions. A base compound or composition is a composition which has a pH of more than 7. The natural latex is a base composition since it has a pH of greater than 7. The addition of more base compositions increase the pH and the cleaning ability of the latex composition. Normally, the pH of the cleaning composition will be 8-11.

Where the cleaning action needs to be aggressive, the amount of base compound in the cleaning compound should be such that the pH of the cleaning compound is substantially 11 or more. Other bases or base chemical compounds, such as NaOH (sodium hydroxide), are added to the cleaning compound to raise the pH level to that desired.

The cleaning/masking compound contains basic compositions, such as aqueous ammonia ($NH_4OH$) or other source of the ammonium ion or other basic composition. One function of the ammonia or other basic composition is to act as a cleaner of the substrate being masked or cleaned by loosening particulates on the substrate. The amount of ammonia or other high pH cleaning agent in the masking compound is determined by the amount of cleaning capability desired. However, a less basic composition can be used where the amount of organic unwanted matter is less.

The filler may be any material that provides the desired viscosity of the masking compound and extends the latex. Typically, the filler may be any of the various well-known fillers, extenders or, optionally, coloring pigments for paints, such as talc, barium carbonate, calcium carbonate, clays (e.g., kaolin or bentonite), silicon dioxide, aluminum oxide, magnesium oxide, iron oxide, sodium oxide, magnese oxide, barium sulphate, mica, titanium oxide, carbon black, iron red and lithopone, cellulose fiber, christolite fiber, Vansil Acicular Wollastonite, preferably kaolin. The amount of filler added to the masking compound is determined by the desired consistency of the compound. Preferably, the masking compound will have a consistency ranging from paint-like to paste-like (e.g., similar to dry wall mud such that the compound can be applied to vertical and horizontal surfaces without excessive dripping or running. Also, preferably, the masking compound will have a consistency suitable for application of the compound by spraying, or with a brush, roller or trowel. The greater the amount of filler used, the thicker the consistency of the masking compound. The amount of the filler is usually from up to about 70 wt. %, preferably up to about 50 wt. %, more preferably up to about 20 wt. % based on the solid content of the masking compound.

Other additives in the masking compound can include stabilizers, such as UV and light stabilizers. Some suitable stabilizers are Tinuvin 292, Tinuvin 1130, Tinuvin 1076, Tinuvin 5151, zinc oxide and titanium oxide available from Ciba Specialty Chemicals Corporation.

An exemplary CLEANING COMPOUND can be:
Cleaning Compound Formula
30.671 lbs. of latex in solution such as Killian Latex Inc. #2000 compound which contains about 0.3% by dry wt. total of ammonia and KOH in an aqueous solution for stabilization and spoilage prevention and EDTA of 1% dry wt. in an aqueous solution.
7.044 lbs. of clay thickener such as ASP® NC X-1 from the BASF Corp., Florham Park, N.J.
0.271 lbs. of UV Absorber such as Tinuvin 5151 from Ciba Specialty Chemicalsp10
0.014 lbs. of fragrance such as Ethyl Alcohol
38.000 lbs. total of Cleaner Compound
Additive 1/Solvent Additive A Solvent Additive Formula is mixed and then added to the Cleaning/Cleaner Compound Formula to increase the cleaning power, prevent the Cleaning Compound from hardening in the container and stabilize the Cleaning Compound. Further, the Additive Formula is compatible with the Cleaner Formula.
Additive 1/Solvent Additive Formula
0.764 lbs. of base/basic agent such as KOH (potassium hydroxide)
0.00594 lbs. of thickener such as CMC (CarboxyMethyl Cellulose)
0.01782 lbs. of chelating agent such as Milco-150 (Sodium Glucoheptonate) from Milport Enterprises, Milwaukee, Wis.
0.00396 lbs. of dissolver such as THFA (TetraHydroFurfuryl Alcohol) from General Chemical West LLC, Hollister, Calif.
0.00792 lbs. of dissolver such as FA (Furfuryl Alcohol) from Ashland Co., Columbus, Ohio
0.00396 lbs. of solvent such as Eastman™ DB Solvent (2-(2-butoxyethoxy)ethanol) from Eastman Chemical Co., Kingsport, Tenn.
0.01782 lbs. of wetting agent such as Milonic™ 10,000 (modified polyethoxylated alcohol and mixed alkyl glucoside and oligosaccharide) from Milport Chemical Co., Milwaukee, Wis.
1.654 lbs. of water
2.475 lbs. total for 38 lbs. of Cleaner Compound Formula
Additive 2/Detergent Additive A Detergent Additive Formula is provided for those situations in which scrubbing or agitation of the cleaning/masking compound into the material to be removed and the surface is used. The Detergent Additive provides further cleaning capabilities and is compatible with the Cleaning Compound Formula.
Additive 2/Detergent Additive Formula
0.2643 lbs. of solvent such as hot water
0.0056 lbs. of detergent such as UNIFLO® 26 (Sodium Metasilicate Pentahydrate) from Occidental Chemical Corp., Dallas, Tex.
0.0207 lbs. of chelating agent such as VERSENE 100® (Tetrasodium EDTA) from Barton Solvents, Des Moines, Iowa
0.0070 lbs. of solvent/coalescing agent such as EASTMAN™ EB Solvent (Glycol Ether EB, 2-butoxyethanol) from Eastman Chemical Co., Kingsport, Tenn.
0.0035 lbs. of solvent/coalescing agent such as EASTMAN™ DB Solvent (Glycol Ether DB, (2-(2-butoxyethoxy) ethanol) from Eastman Chemical Co., Kingsport, Tenn.
0.0343 lbs. of hydrotrope such as STEPANATE SXS (Sodium xylenesulphonate) from Stepan Co., Northfield, Ill.
0.0070 lbs. of softener such as ALFONIC® 810-2 Ethoxylate (Alcohols, C6-C12, ethoxylated) from Sasol North America Inc., Houston, Tex.
0.0070 lbs. of softener such as ALFONIC® 810-4.5 Ethoxylate (Alcohol ethoxylated) from Sasol North America Inc., Houston, Tex.
0.0012 lbs. of thickener such as Aqualon® CMC 7H (Carbobymetheylcellulose in water) from Ashland, Columbus, Ohio
0.3506 lbs. total for 38 lbs. of Cleaner Compound Formula
Additive 3/DAWN® Detergent Additive The Cleaning Compound Formula can also be provided with more detergent additives, such as DAWN® kitchen detergent, which produce soap suds/bubbles when the cleaner is agitated or scrubbed into the surface to be cleaned. The amount of DAWN® detergent can be 0.28 lbs. for 38 lbs. of Cleaning Compound Formula.

Where unwanted materials on the surface are organic, Additive 1/the Solvent Additive, Additive 2/the Detergent Additive and Additive 3/the DAWN® detergent Additive should be doubled in the Cleaning Compound Formula. More thickener, such as ASP® NC X-1 from the BASF Corp., Florham Park, N.J., should be added with the doubling of the above Additives to reach the desired viscosity.

Further, when using the Cleaning Compound Formula to remove paint, a greater amount of the Solvent Additive usually is desirable to loosen the paint, such as a doubling or more. Again, the viscosity should be adjusted to that desired. The paint is loosened by the solvents in the Cleaning Compound Formula in the wet phase.

The Cleaning Compound Formula is applied in the wet or liquid form to the surface where it penetrates into crevices, pores, holes, etc. The cleaning additives in the Cleaning Compound Formula loosen the unwanted matter on the surface by breaking the bonds to the surface which allows the unwanted matter to migrate to the prevulcanized latex. The latex then dries to a latex membrane or film with the unwanted matter joined to it. The latex membrane is then removed with the unwanted matter joined to it, thereby cleaning the surface.

The membrane dries to a non-sticky or non-tacky film which makes it easier to handle. The latex dries from the outside to the inside which allows the cleaning process on the inside to continue for a long time and allows the cleaning agents within the membrane to remove more of the unwanted materials.
Examples of the Cleaning Compound Formulations The following formulations should be tested on the surface to be cleaned to see which works the best. The weights are for a 55 gallon drum container.
Formulation A
210 lbs. of latex in solution such as Killian Latex Inc. #2000 compound which contains about 0.3% by dry wt. total of ammonia and KOH in an aqueous solution for stabilization and spoilage prevention and EDTA of 1% dry wt. in an aqueous solution
55 lbs. of clay thickener such as ASP® NC X-1 from the BASF Corp., Florham Park, N.J.
Next is added 2.2 lbs. of Additive 1/Solvent Additive
2.2 lbs. of Additive 2/Detergent Additive
1.8 lbs. of Additive 3/Detergent Additive
1.0 lbs. of fragrance such as Ethyl Alcohol
Next
1.8 lbs. of UV Absorber such as Tinuvin 5151 from Ciba Specialty Chemicals
0.5 lbs. of water with several drops of Dawn® Detergent
Next
16 lbs. of EDTA
5 lbs. of Water
Formulation B
212 lbs. of latex in solution such as Killian Latex Inc. #2000 compound which contains about 0.3% by dry wt. total of ammonia and KOH in an aqueous solution for stabilization and spoilage prevention and EDTA of 1% dry wt. in an aqueous solution
47 lbs. of clay thickener such as ASP® NC X-1 from the BASF Corp., Florham Park, N.J.
Next is added
10.69 lbs. of NaOH/Water 50%/50% mixture
2.06 lbs. of Additive 2/Detergent Additive
1.69 lbs. of Additive 3/Detergent Additive
0.38 lbs. of fragrance such as Ethyl Alcohol
Next
1.69 lbs. of UV Absorber such as Tinuvin 5151 from Ciba Specialty Chemicals
0.5 lbs. of water with several drops of Dawn® Detergent
Next
16 lbs. of EDTA
5 lbs. of Water Formulation C is a 50%/50% mixture of Formulation A and Formulation B.

Formulation A is the least aggressive/strong Cleaning Compound. Formulation A is useful for removing general unwanted material, such as dirt, deposits on fireplace fronts, soot and smoke damage, etc.

Formulation B is the most aggressive/strong Cleaning Compound. Formulation B is useful for removing paint and other similar coatings.

Formulation C is between Formulation A and Formulation B in aggression and strength.

These formulations should be tested on the material to be removed from the surface to find the best fit for the job.

These formulations keep the percentages of hazardous compositions at 1% or below by dry wt. which allows the Cleaning Compound to be shipped with fewer restriction.

Enzyme Additive

The cleaning composition can also be provided with enzymes which act as a catalyst to accelerate the breakdown of any biological materials that are to be removed. The specific enzyme used in the cleaning compound will be dictated by the specific biological materials to be removed, and thus, the cleaning compound will be customized to the job.

Debonding or Release Agents

The cleaning composition should be substantially devoid of agents which will reduce the adhesion of the cleaning/masking compound membrane. Such agents are sometimes called debonding or release agents. That is the cleaner should not have enough debonding agent to effect the adhesion of the cleaner membrane to the unwanted material to be removed. Such agents can be unsaturated fatty acid-monamides such as oelic acid monamide, fatty bisamides, polyethylene glycol 140 monostearate, petrolatum, synthetic waxes, DOW 36™ silicone emulsion, Jonwax™, paraffin wax, sodium lauryl sulfate, ammonium laurate, PPG-36 oleate, coconut diethanolamide, Epolene wax, fluorocarbon wax and the like. Further, the addition of acids will reduce the tackiness.

Abrasive Additive

The cleaning compound can be enhanced by adding abrasive materials such as garnet, emery, aluminum oxide, silicon carbide, alumina-zirconia (an aluminum oxide and chromium oxide alloy), chromium oxide, ceramic aluminum oxide, cerium oxide, etc, to the cleaner. The size of the particles or grit will vary with the material to be removed and the surface having the material to be cleaned. Usually, the grit will be grains of 2 mm or less. The grit may remove some of the surface that is to be cleaned so it will be used when that is acceptable or desirable. In the case of glass, an abrasive, such as cerium oxide, can be used in the cleaning compound to clean and polish the glass at the same time without scratching the glass.

The abrasive is brought into use by moving the cleaning compound over the surface to be cleaned while applying pressure to score the material to be removed. The cleaning compound with abrasive can be brushed into the surface to be cleaned using a nylon brush, such as those used to strip paint off of furniture. The brush traps abrasive particles between the bristles and scores the material to be removed when the brush is dragged over the surface to be cleaned.

When cleaning a surface, such as a brick fireplace, the brush should be dampened with water since the bricks and like materials will absorb some of the water in the cleaning compound. The extra water will slow down the drying time and allow the cleaning compound more cleaning time. Alternatively, extra water can be mixed into the cleaning compound by hand. The brush is dipped into the cleaning compound, and the cleaning compound is brushed onto the surface to be cleaned. The cleaning compound is scrubbed into the surface. Then, the brush is used to smooth out/level the cleaning compound r so that it will form a coherent/continuous coating after coagulation of the latex particles into a film. During the scrubbing process, the cleaning compound will turn from a milky color to a dirty color as the dirt and/or soot is scrubbed from the surface of the fireplace.

Where there is more dirt or unwanted matter, the grit can be scrubbed/pushed into the surface by using a metal plate. The metal place can be attached to a vibrator which can be hand held or be attached to a handle. The metal plate can be smooth or have holes to trap the grit. The holes serve to trap the grit and to drag the grit over and into the dirt and the surface to be cleaned.

Where the surface is irregular, a floor polishing disk material can be attached to a tool and used to scrub or abrade the surface.

When removing a decal that has a plastic top surface, the plastic surface should be abraded to allow the solvents to loosen the adhesive. The latex of the cleaning compound will not stick with much force to the polyethylene of most plastic decals.

The cleaning compound can be used to remove paint from a building, graffiti from any surface and other coatings from surfaces when desired.

Dirt or Unwanted Matter Removal

When the cleaning compound is applied to remove dirt and other unwanted matter that is not a coating like paint, the Cleaner is applied to the surface and allowed to dry. The latex membrane formed by the drying of the liquid cleaning compound performs three purposes in this process. First, the dried outer layer of the membrane forms a retarding layer that retards the evaporation of liquids of the cleaning agents inside the outer layer while the membrane is drying. Second, the coalescing membrane carries the cleaning agents to the surface to be cleaned and holds them in position to clean the surface. Third, when the latex membrane is dry and peeled from the surface, the membrane removes the dirt and unwanted matter adhered to the membrane. The outer portion of the membrane will normally dry in one hour, but the drying time depends on humidity and temperature. The membrane is left on the wall for longer since the cleaning additives are still working. The thickness of the wet coating should preferably be 0.125 to 0.250 inches. However, more thickness will extend the cleaning time if needed. The membrane is left on the surface until completely dry on both sides which can be for 24 or more hours.

Paint Removal

When the cleaning compound is applied to remove paint, the cleaning compound is applied to the surface and allowed to dry. The latex membrane formed by the drying of the liquid cleaning compound performs two purposes. First, the dried outer layer of the membrane forms a retarding layer that retards the evaporation of liquids of the cleaning agents inside the outer layer while the membrane is forming and drying. Second, the coalescing membrane carries the cleaning agents to the surface to be cleaned and holds them in position to clean the surface.

When the membrane is removed, the paint will have been loosened from the surface by the action of the cleaning agents in the cleaning compound. The cleaning agents break the bonds between the paint and the surface to which the paint was applied. The paint that has been loosened is then removed by scraping, wiping, brushing, vacuuming or otherwise agitating the paint left on the surface.

The dried rubber latex membrane and the paint can be discarded separately. The dried membrane can be recycled into other products and uses.

By adjusting the pH and the additives in the cleaning compound, the cleaning compound can dissolve resins and/or polymers contained in paints and other coatings. Because the membrane dries from the outside to the inside, the cleaning agents in the additives and the cleaning compound are used to their maximum potential. Therefore, the amount of active solvents needed is reduced relative to conventional paint removal systems, and therefore the invention has a smaller environmental impact.

The outside of the membrane dries usually in less than an hour. The dried membrane slows the internal drying of the membrane which keeps the inner portion of the membrane and the cleaning agents active for long periods such as 24 hours. Therefore, the paint is removed more thoroughly with a lesser amount cleaning compound. Usually, a coating of 0.125-0.250 inches is sufficient. A thicker application of the cleaning compound will create a thicker membrane and a greater drying time. When the membrane is completely dry, it is peeled from the surface. The membrane will normally dry in one hour, but the drying time depends on humidity and temperature.

Graffiti Coating Removal

When the cleaning compound is applied to remove graffiti paint, the cleaning compound is applied to the surface and allowed to dry. The latex membrane formed by the drying and coalescing of the liquid cleaning compound performs three purposes. First, the dried outer layer of the membrane forms a retarding layer that retards the evaporation of liquids of the cleaning agents inside the outer layer while the membrane is drying. Second, the coalescing membrane carries the cleaning agents to the surface to be cleaned and holds them in position to clean the surface.

Third, the latex membrane covers/hides the graffiti and keeps it out of view while the cleaning action of the cleaning agents proceeds. The membrane can be left in place for days or months. Then when the membrane is removed, the graffiti paint having been loosened from the surface can be brushed off the defaced surface.

The membrane will normally dry in one hour, but the drying time depends on humidity and temperature. If the surface under the graffiti is painted, it may be desirable to remove the membrane before the paint under the graffiti is affected by the cleaning compound.

The cleaning compound can be provided with pigment so that the membrane when dry will match or somewhat match the building color. If the cleaning compound on the building is sprayed or painted with graffiti paint before being removed, the new graffiti coating will be removed with the membrane. Also, the new graffiti coating can be removed from the membrane by scraping, wiping, brushing or otherwise agitating the graffiti coating left on the surface.

When the membrane is removed, the graffiti paint will have been loosened from the surface by the action of the cleaning agents in the cleaning compound. The cleaning agents break the bonds between the paint and the surface to which the paint was applied. The paint that has been loosened is then removed by scraping, wiping, brushing or otherwise agitating the paint left on the surface.

General Method of Use

The cleaning compound is applied in the liquid state to the surface to be cleaned. Then, the cleaning compound is allowed to work until it dries. At that time, the cleaning compound will be in the state of a dry film, much like the state of a rubber band. The cleaning compound is then pulled from the surface with the unwanted matter attached to the cleaning compound film. The cleaning compound film is not sticky or tacky at this point. In the case of paint removal, whatever paint that is left on the surface is brushed or dislodged from the surface after the membrane is removed.

Method of Disinfecting Areas

Because the cleaning compound can have a high pH such as 10 or more, the cleaning compound can be used to disinfect areas without the need to rinse the area with water after use. The cleaning agents in the cleaning compound are removed from the cleaned surface in the rubber membrane when the rubber membrane is removed.

Abrasive Scrub

Alternatively, the surface to be cleaned can be scrubbed with an abrasive composition before the cleaning compound is applied. Such a composition can be an abrasive grit, a thickener, such as Aqualon® CMC 7H, and water or just water alone with or without other additives. Once the scrub is used to scour unwanted materials and/or the surface, the cleaning compound can be applied over the unwanted material and scrub on the surface. Then, when the cleaning compound membrane is pulled from the surface, the unwanted material and the scrub is removed with the membrane.

The adhesive qualities of the membrane removes the unwanted material and the scrub from the surface. The membrane may need 5 or more lbs. of force applied to the edge of the membrane to pull it from a surface, such as concrete.

Usually once the cleaning compound is removed, there is no need to adjust the pH of the surface because the pH is substantially neutral. The substantial neutrality of the surface removes the need to rinse or otherwise neutralize the surface to prevent degradation due to high pH.

The abrasive can be added to the liquid cleaning composition during manufacture thereof.

If higher pH or more base or basic composition is needed to clean the surface, then there may be a basic residue on the surface cleaned. In that situation, the cleaned surface may be substantially neutralized by using an acid on the surface, such as oxalic acid.

Bleach or Whitening Agent

When the cleaning compound membrane is pulled from the surface to be cleaned, there may be some residual matter such as the chemicals in the membrane, a small amount of the unwanted matter that did not adhere to the membrane, etc., left on the surface. If an acid that acts as a bleach or whitening agent is applied to the surface, the result of this extra step will be a surface with a better look or appearance. Such an acid can be sodium percarbonate ($2Na_2CO_3 \cdot 3H_2O$) from Solvay Chemicals, Houston, Tex. as Oxyper@Sodium Percarbonate. This acid will not only help to neutralize residual base on the surface but will lessen the ability for other matter on the surface to absorb visible light thereby whitening the surface and improving the surface appearance.

The application of the whitening agent can be by cloth or sponge containing the agent. The cloth is wiped over the surface after the removal of the membrane. The wiping can additionally remove any residual matter while applying a whitening agent to what is not removed by the cloth. The whitening agent does not need to be removed from the surface. Therefore, the whitening agent can be left on the surface.

Alternatively, the whitening agent can be sprayed or otherwise applied to the surface with no removal of residual materials.

A reducing agent or base may be used to whiten or bleach where its use would be more desirable.

Other bleaches and whitening agents are sodium hypochlorite, hydrogen peroxide, sodium perborate, calcium hypochlorite, sodium perphosphate, sodium persilicate (and amonium, potassium and lithium analogs), calcium peroxide, zinc peroxide, sodium peroxide, carbamide peroxide, chlorine dioxide, bromate, oxalic acid and organic peroxides (such as benzoyl peroxide).

When the cleaning/masking compound has a paint-like consistency, it can be made using standard latex paint mixing equipment, such as a Cowles mixer usable for materials such as spackle or dry wall mud.

Depending on the consistency, the rubber cleaning/masking compound can be applied with a trowel, brush, roller, spray gun or caulk gun. The cleaning/masking compound can be applied to vertical and overhead surfaces. When the cleaning/masking compound dries, it forms an elastic rubber membrane over or on the surface to which it was applied. The elastic rubber membrane adheres to the surface but is removable with light to moderate force. In some embodiments, removal of the elastic membrane requires a force of about 5 to about 8 pounds.

The fluid nature of the cleaning/masking compound allows the compound to conform to surface texture, cracks and pores in the substrate to which the compound is applied. As such, the compound will bond to the substrate surface regardless of the texture, form, surface tension, moisture content or porosity of the substrate. Examples of such substrates are drywall, concrete or cement, wood, painted surfaces, brick, limestone ledges, stone exteriors and the like. Additionally, the intimate contact between the masking compound and the surface prevents liquids (such as paint, water stain or other finishes) from flowing under the masking and adhesive membrane and also prevents loosening of the membrane by wind, rain or freezing.

Isolating Surfaces (Masking)

The rubber mask can be used to protect a surface from overspray, splattering, drips or smears. For example, the masking compound may be applied to a surface to be protected from inadvertent application of a coating material, e.g., protecting an adjacent surface during paint spraying. The mask can be applied in a thin coat that completely covers the surface to be protected. Next, the masking compound is allowed to dry. When the rubber mask dries it forms an elastic rubber membrane, which masks the surface. The coating, e.g., paint, can then be applied to the surface to be covered. After the adjacent coating operation is completed, the elastic rubber membrane is peeled, along with any overspray or splatters, from the protected substrate. Typically, the elastic membrane will peel off in one piece for easy removal.

Brick Masking

The masking compound/mask can be used to mask the faces of bricks on existing buildings which are being renovated. The mask can be applied in the liquid state to the brick faces. The mask is allowed to form a film on the faces. The mortar between the bricks is then removed from the joint for 0.5 inches. New mortar is then applied to the joint. The mask is removed from the brick faces with any mortar, tuck point smears or other undesirable materials that are on the mask film. The mask film will also provide a cleaning of the brick faces.

This masking process does away with the need for an acid wash of the building before replacing the mortar and an acid wash of the brick faces after the mortar is replaced.

In the case of a new brick building, the mask would be applied to the brick faces before the bricks are laid. This process would eliminate the need for an acid wash to remove any mortar that was deposited on the brick faces.

The masking compound can also function as a poultice/cleaning compound to clean the surface to which it is applied. As above, the masking compound is applied to a surface, preferably as a thin coat of 0.125-0.250 inches. The ammonia and other bases or basic compounds in the masking compound acts to loosen particulate on the surface and can also provide some bleaching action. When the mask dries, it forms an elastic membrane. The elastic membrane can then be peeled from the surface. When the membrane is removed from the surface, many of the particles loosened by the masking compound will be attached to the membrane, thereby leaving the surface cleaner. As such, the masking compound is useful in situations where dry/no rinse cleaning is necessary or desirable.

Anti-Graffiti Mask/Paint

The masking compound can be used as an anti-graffiti paint on a structure that maybe subjected to graffiti coating or graffiti paint. A synthetic rubber polymer may be used to provide a more durable coating than natural latex if the synthetic rubber has a high degree of elasticity as is exhibited by natural rubber. The masking compound can have pigments, such as $TiO_2$ and others, added to it to provide color to the membrane and the building.

As a permanent coating, the anti-graffiti paint will need UV protection similar to regular paint. The UV protection can be accomplished by the use of $TiO_2$ and other pigments and of UV Absorbers such as Tinuvin 5151 from Ciba Specialty Chemicals.

Further, the anti-graffiti paint will not need cleaning agents since it will be functioning as a permanent coating.

If graffiti paint was applied to the latex membrane, the graffiti paint could be removed by brushing or agitating the membrane or anti-graffiti paint. The agitation of the membrane causes the membrane to flex which dislodges the graffiti paint. The agitation can be caused by vibrators such as a RYOBI® sander can be used without the sanding sheets to agitate the surface. These sanders have dust collection bags which would collect the graffiti paint. Vacuum cleaners can be used to collect the graffiti paint and any other coatings or debris dislodged by the agitation.

The masking compound would be used as an anti-graffiti paint which would be the only paint needed on a structure. In this version of the mask, the mask would be designed to be a permanent coating on the surface to be protected. However, the masking compound can be used as a primer. Regular paint would be applied over the rubber primer. If graffiti was applied on the regular paint, the graffiti could be agitated off of the paint and anti-graffiti primer as with the anti-graffiti paint. The primer would be then repainted.

The use of anti-graffiti paint or primer allows the removal of graffiti without the expense of and need to carry heavy equipment, such as with power washing and sand blasting to the location of the graffiti.

Isolating Volumes and Surfaces

The rubber masking compound can also be used as an adhesive in combination with flexible sheets or films or drop cloths to isolate or define a space or a surface or portion of a surface. An example of isolating a space would be to separate a room from the rest of a building by sealing off a doorway. Such isolation can be accomplished by applying the adhesive masking compound along at least part of the edge or perimeter of the doorway or along the doorway wall in close proximity to the doorway opening. A sheet can then be affixed or applied to the masking compound, before the adhesive masking compound dries, such that the sheet covers the doorway opening. The masking compound will dry into an elastic film or membrane. The masking compound holds the sheet securely in a weather resistant seal. The elastic compound film or membrane can be peeled cleanly from the doorway and also from the sheet. The ability to easily separate the elastic film and the sheet allows the sheet to be reused over the same or a different opening. Such reuse is particularly useful in painting a series of rooms with identical sized doorways, such as in a hotel. The adhesive compound and sheet can be used on drywall, concrete or cement surfaces, stairs outside of the carpeting, windows, wind shields, other glasses, plastics, painted surface, wood surfaces and similar surfaces. In this process, it would be possible to use a small amount of debonding agents if the adhesive effect of the dried masking compound was too large and pulled wanted materials off of the surface it was applied to.

An example of defining or dividing a space is to form a curtain wall by suspending the sheet from a ceiling such that the suspended sheet forms an enclosed area. For instance, the sheet could be suspended across the ceiling in the middle of a room or used to isolate the corner of a space. The isolation or division can be accomplished by applying the adhesive masking compound to a ceiling in the desired pattern and location including suspended ceilings and drop ceiling frames. Optionally, the masking compound can be applied to the corresponding locations or surface portions on the floor and/or the walls. A sheet can then be affixed or applied to the masking compound such that the sheet forms a temporary curtain wall. The masking compound will dry into an elastic film. The adhesive masking compound holds the sheet securely in a weather resistant seal. The elastic film can be peeled cleanly from the doorway and also from the sheet. The ability to easily separate the elastic film and the sheet allows the sheet to be reused in the same or a different space. The curtain wall will prevent the introduction of drywall dust, remodeling dust, paint overspray, fumes, etc. from entering the protected area.

Also, the adhesive masking compound can be used to isolate a surface or a portion of a surface. The adhesive masking compound is applied to at least portions of the perimeter of the surface or the portion of the surface to be isolated as in the isolation of volumes. A sheet can then be applied to the masking compound to isolate the surface or the portion of the surface. The masking compound holds the sheet securely in a weather resistant seal. The elastic film can be peeled cleanly from the surface and also from the sheet. The ability to easily separate the elastic film and the sheet allows the sheet to be reused on the same or a different surface or volume. The sheet will prevent the introduction of drywall dust, remodeling dust, paint overspray, fumes, etc. from entering the protected surface. The adhesive compound and sheet can be used on drywall, concrete or cement surfaces, stairs outside of the carpeting, windows, wind shields, other glasses, plastics, painted surface, wood surfaces and similar surfaces.

The adhesive masking compound to hold down a drop cloth or plastic sheet on which people walk can prevent slipping of the sheet or drop cloth caused by those working on it.

Crack Filling

Further, the mask can be used in a process for filling a crack or hole in a surface. The mask is applied to cover the crack. When the mask dries, the resultant membrane adheres to each side of the crack and bridges the crack. A hole is made in the membrane at the center and at each end of the crack. Then, a crack filling material is injected through the center hole into the crack. The injection of filler material is stopped when the filler material comes out of the holes in each end of the membrane. Once the filler material sets or dries, the membrane can be removed. This process is especially useful for cracks in elevated structures such as vertical walls, ceilings, etc.

The adhesion of the mask holds the membrane to the surface with sufficient force to provide a temporary cover during the injection process. The adhesion gives the mask the ability to stay in position during the injection process and to withstand the forces of the injection process which try to separate the membrane from the surface.

The crack filling process can be used on any surface, such as concrete, plaster, drywall, stucco, etc. When using the mask on a surface like drywall, the mask may stick to the paper covering of the drywall with enough force to pull the paper off of the drywall. In that case, the adhesion of the mask can be adjusted by adding a debonding agent or a release aid to the cleaning compound from those previously set forth.

Where the crack is large or like a hole having a large width, the mask can be applied to the areas around the edges of the crack and then allowed to dry to a film or membrane. The membrane is then trimmed to match the edge by cutting. Then, the hole is filled with a material such as plaster, to fill the hole. The mask can then be removed with any filler or plaster that has mistakenly overlaid the mask on it.

Recycle of Used Membrane

Where the membrane has abrasives or grit in it, the membrane can be later used as a blast media for a sponge blasting system. The membrane is reduced to small particle size by a ball mill, grinder or other device. Then, the particles of membrane and grit are used in a sponge blasting process to remove coatings, abrade and profile surfaces. This will produce a dust-less blasting media and reuse waste material from one of the processes using the membrane.

The used cleaner membrane can be made into particles and used in various products such as low noise pavement for highways, other products using rubber as a component such as tires, drain tiles, roof tiles, etc. or can be used as a mulch.

While the disclosure has been described with reference to several embodiments and methods of use, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiments and methods of use disclosed as the best mode contemplated for carrying out this disclosure, but that the disclosure will include all embodiments falling within the scope of the appended claims.

I claim:

1. A method of cleaning a surface of unwanted matter comprising the following steps:

providing a liquid cleaning composition having a prevulcanized natural rubber latex, at least one detergent additive and a basic composition selected from the group consisting of aqueous ammonia, NaOH, KOH, and mixture of tetrasodium ethylenediaminetetraacetate, NaOH, and trisodium nitriloacetate to provide a pH of the cleaning composition of at least 8;

applying the liquid cleaning composition to the surface over the unwanted matter, allowing the cleaning composition to form an elastic rubber membrane, drying the membrane, and removing the dry elastic rubber membrane from the surface with the unwanted matter attached to the membrane.

2. The method of claim 1 in which the unwanted matter is germs and other unwanted matter from the surfaces of public places.

3. A method of removing paint from a surface comprising the following steps:

providing a liquid cleaning composition having a prevulcanized natural rubber latex, at least one detergent additive and a basic composition selected from the group consisting of aqueous ammonia, NaOH, KOH, and mixture of tetrasodium ethylenediaminetetraacetate, NaOH, and trisodium nitriloacetate to provide a pH of the cleaning composition of at least 8;

applying the liquid cleaning composition to the surface over the paint, allowing the cleaning composition to form an elastic rubber membrane, and removing the elastic rubber membrane from the surface with the paint attached to the membrane.

4. The method of claim 3 wherein, the paint to be removed is graffiti paint on a surface and a pigment is added to the cleaning composition to hide the graffiti paint.

* * * * *